(No Model.)

T. CROOKE.
MOUSE TRAP.

No. 270,753. Patented Jan. 16, 1883.

Witnesses
J. H. Causelyea
R. L. Steadman

Inventor
Thomas Crooke
By Horace Harris
Atty

UNITED STATES PATENT OFFICE.

THOMAS CROOKE, OF NEWARK, NEW JERSEY.

MOUSE-TRAP.

SPECIFICATION forming part of Letters Patent No. 270,753, dated January 16, 1883.

Application filed October 16, 1882. (No model.)

*To all whom it may concern:*

Be it known that I, THOMAS CROOKE, of Newark, in the county of Essex and State of New Jersey, have invented a new and useful Improvement in Mouse-Traps, of which the following is a specification.

My invention relates to an improvement in mouse-traps, wherein I make a trap wholly of glass, the object being to have the food for bait in the inside to be seen from the outside; and, also, if one mouse has entered he may be seen by others who may chance to go that way, who will be inclined to join the one or more inside, especially when they see inside something to eat; and it consists in the devices substantially as hereinafter set forth.

Figure 1:
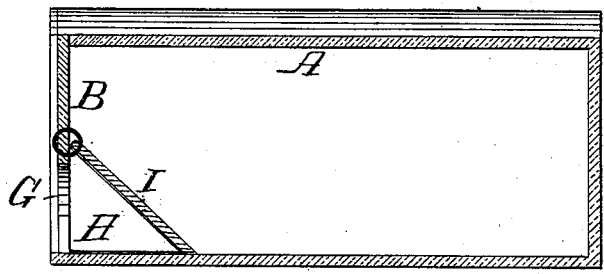
Figure 2:
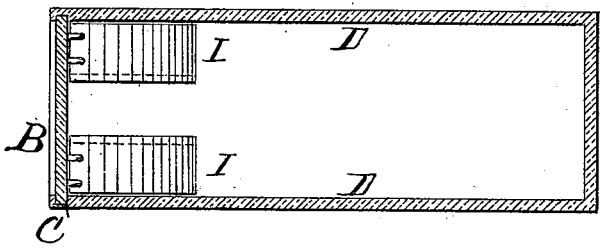
Figure 3:
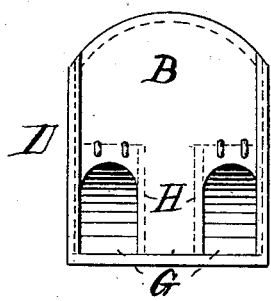
Figure 4:
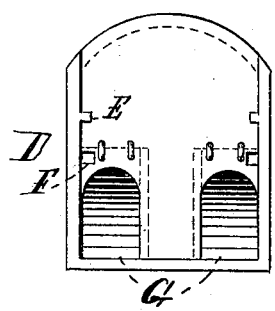

Figure 1 is a longitudinal section. Fig. 2 is a sectional plan below the cover. Figs. 3 and 4 are end views, showing modifications.

In my construction I make a mouse-trap wholly of glass. The box A, embracing the top and bottom, the two sides, and one end, is blown or molded of glass, all in one piece, the top being made convex longitudinally, but not necessarily so, as I do not confine myself to this or any particular shape or form. The end B, also of glass, is adapted to slide in grooves C in the sides D of the box, and by its weight to be held closed; or it may be otherwise held in position, filling the end that had been left open. For example, lugs or ribs may be made on the inside of the sides, between which this end piece may be pushed down; or, as seen in Fig. 4, a lug or lugs, E, may be left on the sides, and a corresponding notch, F, in the edges of the end piece. This end will then be pushed in from the front, the lug E passing through the notch F, and when past it the end will be pressed down a little and be caught behind the lugs. (See Fig. 4.) The end is made with openings G and shoulders H inside, and sloping, to receive and support the doors I, also of glass; or this shoulder or support may be made as a part of the bottom of the box in the same position, and the end will then fit against it. The door is hinged to the end and made to drop down on the support H. This door will be light, of thin glass, and be easily raised by a mouse who seeks to gain entrance.

To take out the mouse when caught it is only necessary to raise the end piece a little way.

I claim—

A mouse-trap made wholly of glass, having the top and bottom and two sides and one end all of one piece, and the end piece, B, having the openings G, shoulders H, and doors I, and adapted to slide into position and be held by lugs or grooves closing the end, substantially as and for the purpose specified.

THOMAS CROOKE.

Witnesses:
HORACE HARRIS,
T. W. MORRISON.